United States Patent [19]

Kelly et al.

[11] Patent Number: 5,003,305
[45] Date of Patent: Mar. 26, 1991

[54] APPARATUS AND METHOD FOR DISPLAYING AIRCRAFT FLIGHT PATH ANGLE ON AN ATTITUDE DISPLAY INDICATOR

[75] Inventors: Brian D. Kelly, Redmond; Scott L. Pelton, Renton, both of Wash.

[73] Assignee: The Boeing Company, Seattle, Wash.

[21] Appl. No.: 490,007

[22] Filed: Mar. 6, 1990

Related U.S. Application Data

[63] Continuation of Ser. No. 261,951, Oct. 24, 1988, abandoned.

[51] Int. Cl.$^5$ .............................................. G01C 21/00
[52] U.S. Cl. ................................... 340/974; 244/181; 340/976; 364/434
[58] Field of Search .............. 340/967, 969, 971, 978, 340/973-976; 73/178 R, 178 T; 364/434, 435; 244/181

[56] References Cited

U.S. PATENT DOCUMENTS

| 3,851,303 | 11/1974 | Muller | 340/975 |
| 4,147,056 | 4/1979 | Muller | 340/975 |
| 4,373,184 | 2/1983 | Lambregts | 364/434 |
| 4,536,843 | 8/1985 | Lambregts | 364/434 |

Primary Examiner—Joseph A. Orsino
Assistant Examiner—Brent A. Swarthout
Attorney, Agent, or Firm—R. H. Sproule; B. A. Donahue

[57] ABSTRACT

A flight path angle symbol is positioned on an aircraft attitude display indicator as a function of either a measured flight path angle or a flight path angle commanded by the pilot. When the aircraft is operating within a selected airspeed, angle of attack, pitch attitude or load factor range, or the difference between measured flight path angle and commanded flight path angle is within a selected range, the symbol is positioned on the display as a function of commanded flight path angle. However when the aircraft is operating outside any of these ranges, the symbols is positioned on the display as a function of the measured flight path angle. To avoid a rapid jump in symbol position when transitioning between measured and commanded flight path angle displays, a phase lag filter is used to attenuate and lag the symbol positioning signal.

16 Claims, 5 Drawing Sheets

APPARATUS AND METHOD FOR DISPLAYING AIRCRAFT FLIGHT PATH ANGLE ON AN ATTITUDE DISPLAY INDICATOR

CROSS REFERENCE TO RELATED APPLICATION

This application is a continuation of Ser. No. 07/261,951 filed Oct. 24, 1988 and now abandoned.

TECHNICAL FIELD

The present invention relates to an aircraft flight attitude display, and more particularly to an attitude display indicator which includes a symbol which displays the flight path angle of the aircraft.

BACKGROUND OF THE INVENTION

It is known technology to display the flight path angle of an aircraft on an aircraft attitude display indicator. Since flight path angle is the angle between the velocity vector of the aircraft and the horizon, it has been found useful to navigate the aircraft in a vertical direction by reference to a flight path angle symbol.

For example in U.S. Pat. No. 3,668,622 by Gannett et al there is disclosed an aircraft attitude display having superimposed thereon a first symbol indicating aircraft actual flight path angle and a second symbol indicating aircraft potential flight path angle.

A heads up display which has superimposed thereon a symbol representing the aircraft flight path is disclosed in U.S. Pat. No. 3,686,626 by Bateman et al.

In U.S. Pat. 2,896,145 by Snodgrass, flight path angle is determined by two different methods and the results combined to operate a flight path angle indicator. And, in U.S. Pat. No. 4,373,184 by Lambregts there is disclosed an attitude indicator on which the actual flight path angle of an aircraft and the commanded flight path angle of the aircraft are both displayed.

Furthermore, an aircraft flight path angle display system using a "quickened" flight path angle indicator is discussed in U.S Ser. No. 499,290 filed May 31, 1983, now abandoned, entitled "Aircraft Flight Path Angle Display System" by Lambregts and assigned to the assignee of the present invention.

A number of problems have arisen with conventional flight path angle displays. For example, in those displays which show both commanded flight path angle and actual flight path angle, there is sometimes a tendency for the pilot to be confused by the presence of both symbols. No intuitively clear symbology exists to indicate which symbol is commanded flight path angle and which symbol is actual flight path angle.

In some displays only one flight path angle symbol is shown. Typically this flight path angle symbol represents the actual flight path angle of the aircraft. In turbulent conditions or where sudden, abrupt changes are made to the direction of aircraft flight, the actual flight path angle symbol tends to be unstable thereby making it difficult to navigate the aircraft by reference to this symbol.

Another problem with navigating an aircraft by reference to the actual flight path angle symbol is due to the lag in the symbol movement when responding to changes in aircraft pitch. This lag is due to the fact that when the aircraft pitches up from level flight, for example, the center of gravity of the aircraft, and hence the aircraft velocity vector, initially is directed downward. This is a result of a downward force on the tail when the pilot pulls back on the control column to pitch the aircraft up. In this manner the initial value of flight path angle is negative until the aircraft begins climbing, and it accounts for the lag in the flight path angle display.

SUMMARY OF THE INVENTION

In order to overcome the aforementioned problems, the present invention pertains to a method of positioning an aircraft flight path angle symbol on a display. The method includes a first step of measuring a flight path angle of the aircraft, as well as a second step of moving a flight control of the aircraft to a selected position to fly a commanded flight path angle. In a further step it is determined whether or not the aircraft is operating within a selected flight parameter, such as an aircraft envelope protection mode.

The method further includes the step of positioning the flight path angle symbol on the display as a function of the selected position of the aircraft flight control when the aircraft is operating within the selected flight parameter.

On the other hand, the flight path angle symbol is positioned on the display as a function of the measured flight path angle when the aircraft is not operating within the selected flight parameter.

BRIEF DESCRIPTION OF THE DRAWINGS

The present invention will be described in greater detail by reading the following detailed description in conjunction with the attached drawings, in which.

DETAILED DESCRIPTION

Figure 1:
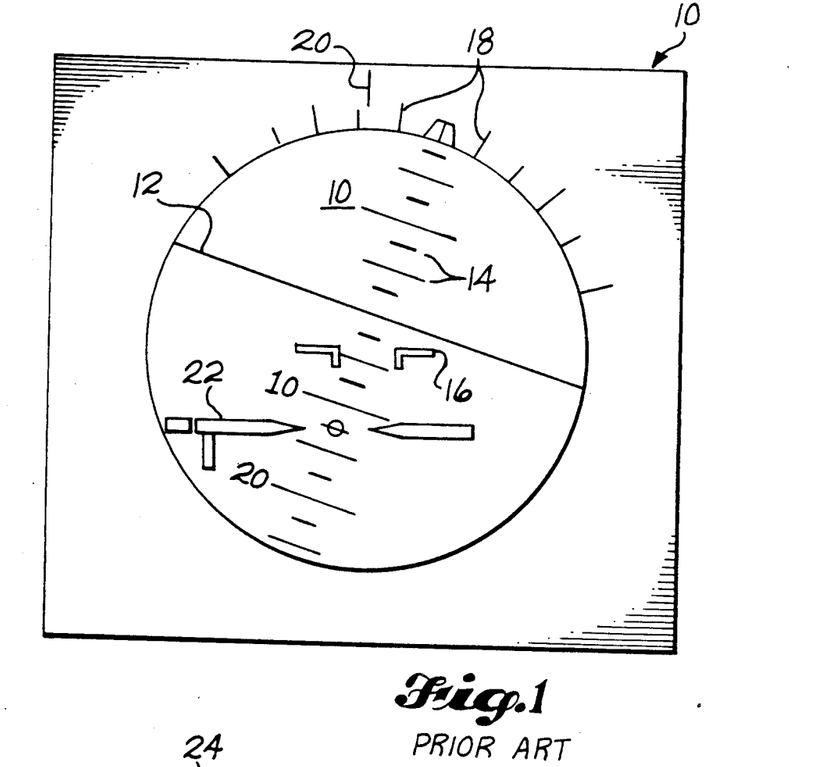
FIG. 1 is a diagram of a conventional electronic attitude display indicator which includes a symbol to indicate flight path angle.

Referring first to FIG. 1, there is shown a conventional electronic attitude director indicator (EADI) generally indicated at 10. The EADI 10 includes a movable horizon line 12 as well as movable pitch scale lines 14 in increments of two and one half degrees. The pitch of the aircraft is displayed by the relationship of a stationary horizontal aircraft symbol 16 to the pitch scale lines 14. In FIG. 1, the pitch of the aircraft is shown to be about three degrees below the horizon. Aircraft bank angle is displayed by the position of a movable bank angle scale 18 relative to a fixed bank angle pointer 20. The scale 18 is marked in increments of five degrees. In FIG. 1, the bank angle of the aircraft is about seven degrees left wing down.

Aircraft flight path angle is indicated by the relationship of a movable flight path angle symbol 22 to the horizon symbol 12. In FIG. 1, the flight path angle symbol 22 is about twelve and one half degrees below the horizon.

It is sometimes desirable to navigate the aircraft by referencing the flight path angle symbol 22 on the EADI. For example, a typical descent angle when approaching a runway is three degrees. A convenient method of flying this approach when a flight path angle symbol is displayed is for the pilot to lower the aircraft nose so that the flight path angle symbol 22 is positioned at three degrees below the horizon on the pitch scale. Corrections are made automatically to the pitch attitude of the aircraft so that the flight path angle symbol 22 remains at three degrees below the horizon.

As indicated in the Background of the Invention, in conventional flight path angle control systems it is sometimes difficult to control the aircraft by referencing the flight path angle symbol. This is particularly true when the position of the flight path angle symbol is a function of the measured flight path angle of the aircraft. By the term "measured flight path angle" it is meant the angle measured between the aircraft velocity vector and the horizon.

To overcome these difficulties, in the present invention two different flight path angle signals are utilized to position the symbol 22 on the EADI 10. That is, during normal operation of the aircraft, a commanded flight path angle signal is used to position the symbol 22. This is accomplished by the pilot who positions the control column to intercept the desired commanded flight path angle. When the flight path angle is reached, a conventional flight path angle control system automatically holds the flight path angle set by the pilot. This is accomplished by comparing the commanded flight path angle with the measured flight path angle and generating an error signal to intercept and track the commanded flight path angle n a manner to be discussed later.

A flight path angle symbol controlled by commanded flight path angle is often preferable to a symbol controlled by measured flight path angle. This is because the commanded flight path angle symbol is not subject to the aforementioned lag or instability due to turbulence, windshear or transients in airplane dynamics. For example, turbulence can cause measured flight path angle to change quite rapidly. Attempting to fly the aircraft in response to these sudden changes in displayed flight path angle can be both difficult and undesirable. Whereas when commanded flight path angle is displayed, the pilot merely moves the aircraft control column to achieve the desired flight path angle, and the aircraft control system automatically maintains this commanded flight path angle.

However, there are occasions when it is more useful to control the position of the flight path angle symbol as a function of the measured flight path angle rather than as a function of the commanded flight path angle. For example, the aircraft may be subjected to a disturbance which generates a large difference between commanded and measured flight path anglo. When only commanded flight path angle is shown on the EADI, the pilot may not be aware that this difference is too large for safe operation of the aircraft. That is, the change in flight path angle of the aircraft may be too large for the aircraft to automatically correct in sufficient time to avoid hazardous operation. In this case, it is more useful to display measured flight path angle in order to make the pilot aware of the actual aircraft situation so that immediate corrective measures can be taken.

In some aircraft there are conventional envelope protection control systems which automatically correct for or prevent excursion into dangerous flight conditions. For example, if the aircraft is approaching an overspeed condition where the high speed of the aircraft could result in structural damage, the control system automatically increases the aircraft pitch attitude to decrease the airspeed to a safer level. Other envelope protection control systems provide protection from an underspeed or stall condition where the control system automatically lowers the aircraft pitch attitude. Other envelope protection modes include protection from high and low pitch attitudes, protection from high G load factors as well as from negative G load factors, and protection from high angles of attack. In the situation where the aircraft enters an envelope protection condition, it is much more useful to have measured flight path angle displayed when implementing these recovery procedures.

In the present invention the position of the flight path angle symbol 22 on the EADI is a function of measured flight path angle under the following conditions: (1) when the aircraft is operating in an envelope protection mode, or (2) when the difference between commanded flight path angle and measured flight path angle exceeds predetermined limits for a predetermined period of time. Otherwise, the position of the flight path angle symbol 22 on the EADI is a function of the commanded flight path angle. To avoid confusing the pilot during the transition between commanded flight path angle and measured flight path angle, the flight path angle symbol 22 does not immediately jump to its new position when the transition is made. Rather, when the decision is made to transition between commanded flight path angle and measured flight path angle, the flight path angle symbol 22 is gradually moved between its measured flight path angle position and commanded flight path angle position.

Figure 2:
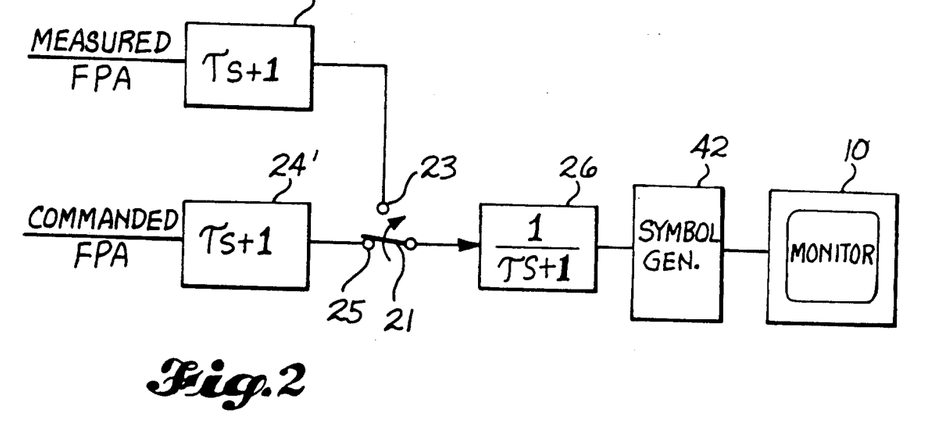
FIG. 2 is a block diagram of a controller of the present invention for positioning a flight path angle symbol as a function of either a measured flight path angle or a commanded flight path angle.

The manner in which this is accomplished can be ascertained by referring to the block diagram of FIG. 2. In FIG. 2 there is shown a switch 21 which passes a measured flight path angle signal or a commanded flight path angle signal downstream depending upon the switch position. Measured flight path angle is fed to a node 23 of the switch 21 via a conventional proportional plus derivative processor 24 having a transfer function of $\tau s + 1$ where $\tau$ is the time constant of the processor and s is a Laplace operator. Similarly, commanded flight path angle is fed through another proportional plus derivative processor 24' to a node 25 of the switch 21. Downstream of the switch 21 the flight path angle signal is fed through a conventional first order, integration type lag filter 26 having a transfer function of $1/(\tau s + 1)$. In an exemplary embodiment, the time constant of the processors 24 and lag filter 26 is two seconds.

In a normal operating mode, i.e. the aircraft is not in an envelope protection mode and the difference between the measured flight path angle and commanded flight path angle does not exceed predetermined limits, the switch 21 is connected to node 25 so that commanded flight path angle is relayed downstream. However, if the difference between commanded flight path angle and actual flight path angle (ΔFPA) exceeds a predetermined limit (e.g. three degrees), for a predetermined time limit t (e.g. the processor 24 time constant τ), or one of the envelope protection conditions is met with regard to angle of attack, airspeed, pitch attitude or G loading, switch 21 is moved to node 23 to relay the measured flight path angle signal downstream.

Figure 3:
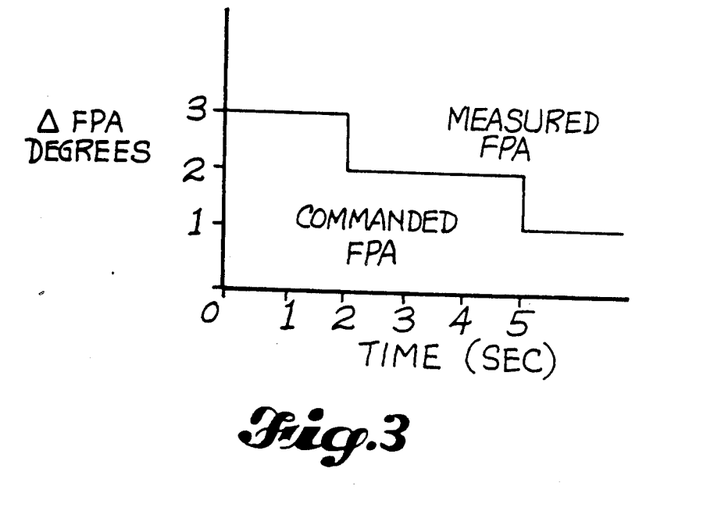
FIG. 3 is a graph which shows a differential between measured flight path angle and commanded flight path angle as a function of time for transitioning between commanded flight path angle and measured flight path angle displays.

In an exemplary embodiment, the limit ΔFPA decreases as a function of the time limit t. More specifically, as shown in FIG. 3, a ΔFPA of three degrees is permitted for only two seconds before switching from commanded flight path angle to measured flight path angle. However a ΔFPA of two degrees is permitted for five seconds before switching from commanded flight path angle to measured flight path angle.

In the present invention, an input to lag filter 26 (FIG. 2) resulting from movement of switch 21 between nodes 23, 25, results in an output which is attenuated and which has a phase angle which lags the input. This provides a smooth visual transition between the position of the symbol 22 when operating as a function of measured flight path angle, and the position of symbol 22 when operating as a function of commanded flight path angle. In the present invention the proportional plus derivative transfer function and the lag filter transfer function cancel each other out so that the net transfer function is unity gain.

Figure 4:
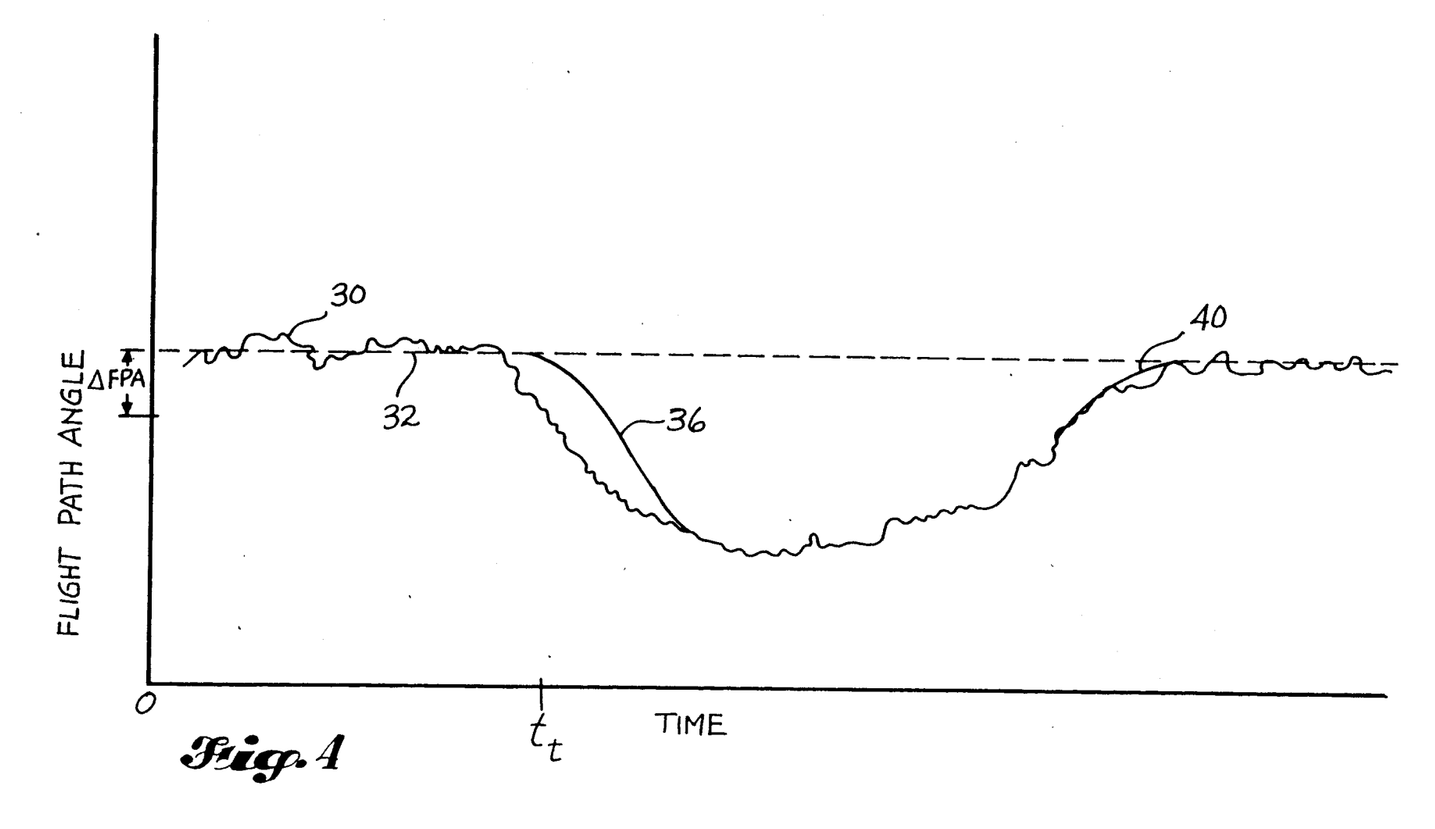
FIG. 4 is a graph showing measured flight path angle and commanded flight path angle as functions of time, and further showing transitions between commanded and measured flight path angle provided by the present invention.

Referring now to FIG. 4, there is shown a graph of commanded flight path angle and measured flight path angle as functions of time. Beginning at time zero the aircraft is operating in the commanded flight path angle mode. Commanded flight path angle, represented by the line 32, remains constant as there are no pilot control column inputs. Due to the fact that the aircraft is subjected to minor turbulence, there are small changes in the measured flight path angle identified by the number 30.

By time $t_i$, the difference, ΔFPA, between the measured flight path angle and the commanded flight path angle has exceeded the predetermined maximum of, for example, three degrees for a sufficient period of time. This results in switch 21 (FIG. 2) feeding the measured flight path angle signal downstream in place of the commanded flight path angle signal. The lag filter 26 attenuates and lags the measured flight path angle input in order to generate an output which gradually moves the symbol to a location corresponding to the measured flight path angle value. This is shown by a line identified by the number 36 (FIG. 3); the slope of the line 36 being a function of the filter time constant.

After the pilot has made the necessary corrections and the maximum difference between the measured flight path angle and the commanded flight path angle is no longer exceeded, switch 21 returns to the position shown in FIG. 2. In this manner, the commanded flight path angle signal is passed downstream in place of the measured flight path angle. As shown in FIG. 4, the resulting input to the lag filter 26 is attenuated and lagged in phase in the manner represented by the line 40. Therefore, the flight path angle symbol gradually transitions to a commanded flight path angle display.

As further shown in FIG. 2, the flight path angle output from the lag filter 26 is fed downstream to a conventional symbol generator 42, and the symbol is displayed on the conventional EADI 10. In an exemplary embodiment, the symbol generator 42 is a Model S242T404-413 manufactured by Collins Avionics, and the EADI 10 is a Model S242T404-511, also manufactured by Collins Avionics.

In an exemplary embodiment, a "quickened" flight path angle is used in place of measured flight path angle. As mentioned previously, there is a lag in the measurement and display of measured flight path angle after a change in aircraft pitch attitude. This is because the airplane center of gravity initially moves in an opposite direction to pitch attitude at the beginning of a maneuver initiated by the pilot.

In order to overcome this lag, there is provided a quickened flight path angle. In its simplest terms quickened flight path angle is equal to the sum of the measured flight path angle (FPA) and a pitch rate of change ($\theta$*s) of the aircraft. More specifically, FPA (quickened) = FPA (measured) + $(s/(\tau s+1))*\theta$ where $\theta$ = aircraft pitch attitude, s = Laplace transform operator, and $\tau$ = washout function time constant which preferably is one second.

Figure 5:
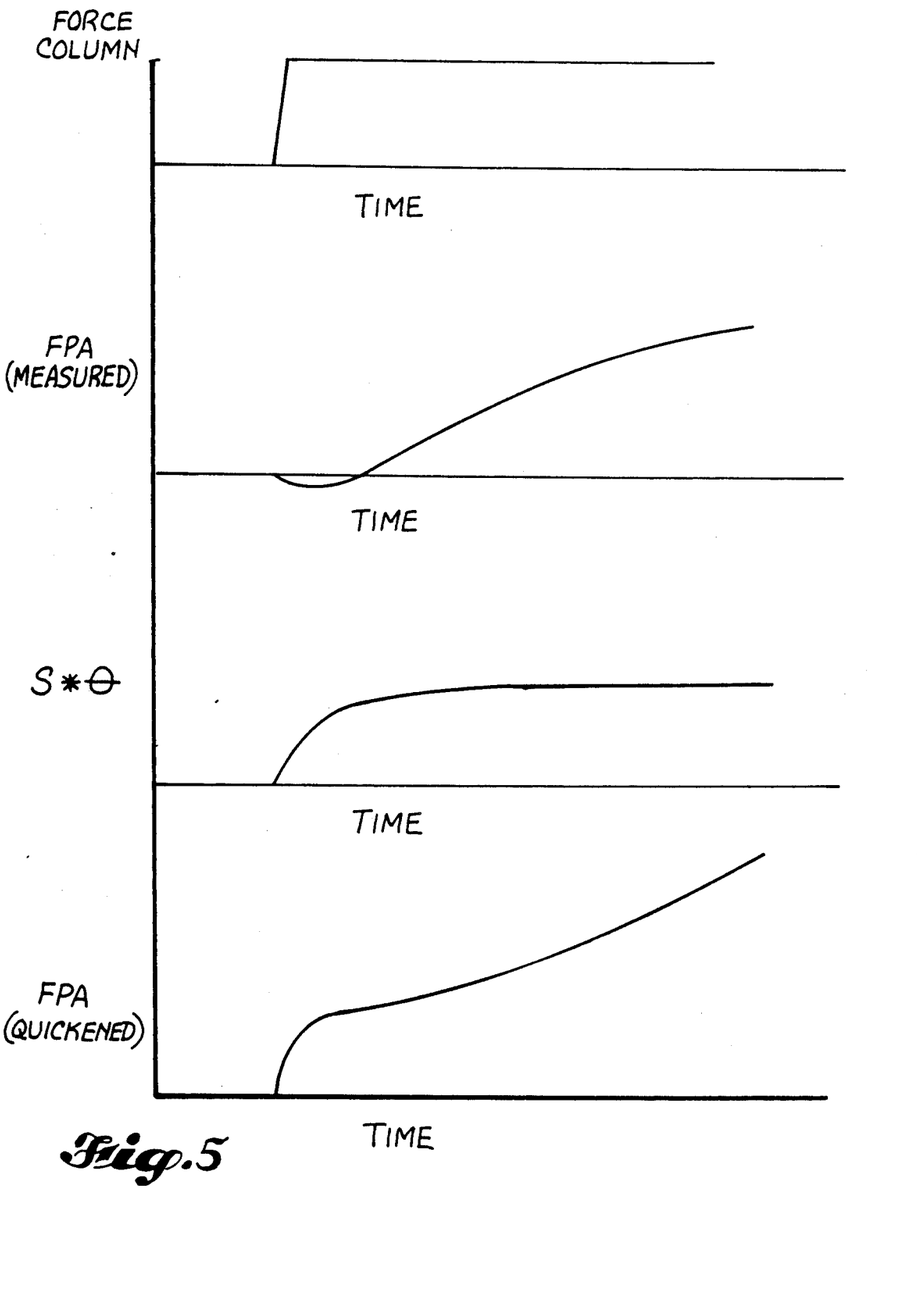
FIG. 5 are graphs of control column force, measured flight path angle, rate of change of pitch attitude, and quickened flight path angle, all as functions of time.

As shown in FIG. 5, in response to a pull force X exerted on the control column of the aircraft, the aircraft measured flight path angle initially increases in a direction which is opposite to the direction of pitch attitude. On the other hand, the pitch attitude rate of the aircraft ($\theta$*s) increases rapidly in the direction of pitch attitude. Therefore, when the pitch rate term is filtered by the transfer function $1/(\tau s+1)$ and added to measured flight path angle, the quickened flight path angle output is provided without the lag.

Measured flight path angle is generated in a conventional manner from the aircraft inertial navigation system, such as the system on board Boeing 757 and 767 aircraft, Model Number S242T101-105 built by Honeywell Commercial Avionics. A further discussion of quickened flight path angle is provided in *NASA Publication* 2170 Part 1, 1980 *Aircraft Safety and Operating Problems*.

Figure 6:
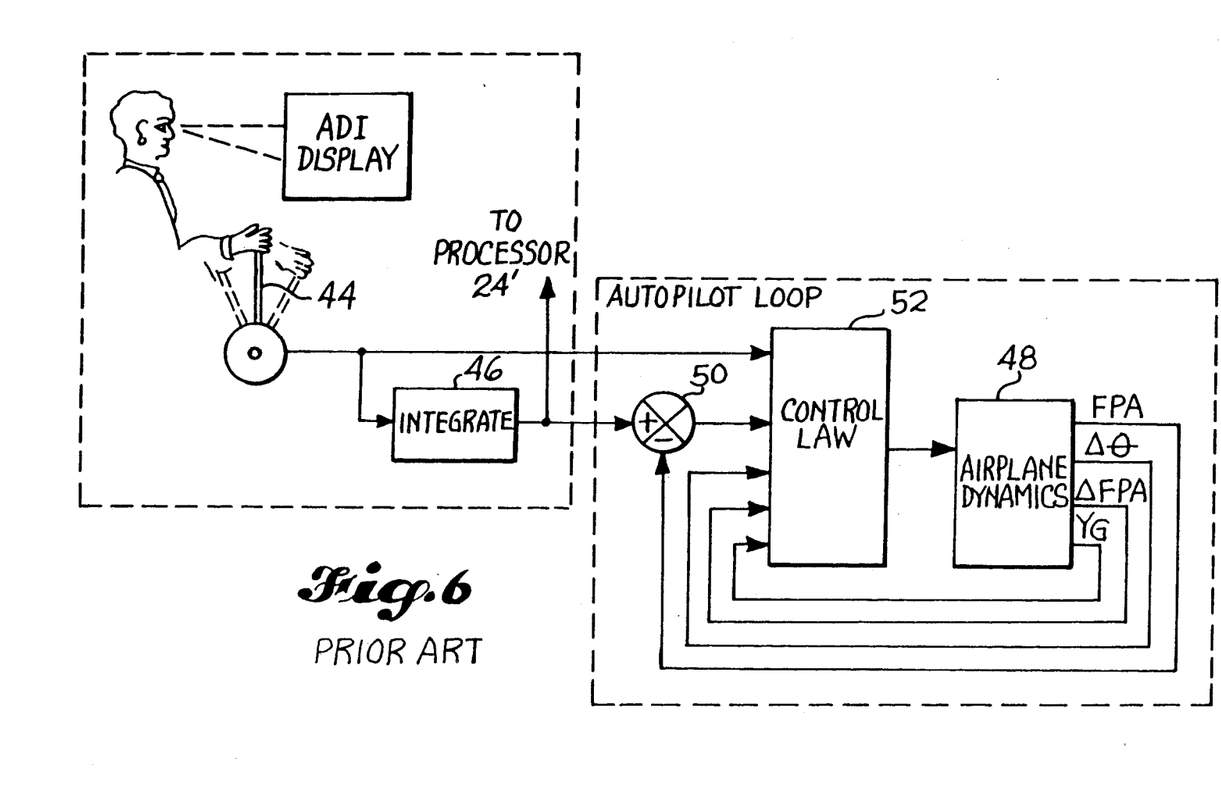
FIG. 6 is a simplified block diagram of a conventional controller for capturing and tracking a commanded flight path angle.

Having provided a discussion of the origin of quickened flight path angle, attention now will be turned to a method for generating commanded flight path angle. Referring to FIG. 6, the pilot generates the desired flight path angle command by displacement of the aircraft control column 44. Sensors at the control column generate a signal which is representative of control column position or applied force. This signal is integrated by a conventional integrator 46 to produce a signal representative of commanded flight path angle.

A flight path angle error signal is generated by a subtractor 50 by taking the difference between the commanded flight path angle and the measured flight path angle as supplied by airplane dynamics block 48. The flight path angle error signal is used as the main input to a control block 52. The flight path angle error signal is processed along with a signal representative of the rate of change of flight path angle $\gamma$, column position $P_c$, rate of change of pitch attitude $\theta$, and aircraft ground speed $V_G$, to form an elevator command. The elevator command signal is applied to the aircraft s elevator control which generates the necessary airplane dynamics to capture and track the commanded flight path angle. A further discussion of this control system for capturing and tracking a commanded flight path angle is set forth in U.S. Pat. No. 4,373,184 by Lambregts, the contents of which are incorporated herein by reference.

What is claimed is:

1. A method of displaying a flight path angle symbol, the method comprising the steps of;

a. measuring a flight path angle of an aircraft;

b. moving a flight control of the aircraft to a selected position to fly a commanded flight path angle;

c. determining whether the aircraft is operating within a selected flight envelope; and d. displaying one flight path angle symbol on the display in a manner that
   (1) the flight path angle symbol is positioned on the display as a function of the selected position of the aircraft flight control if it is determined that the aircraft is operating within the selected flight envelope, and
   (2) the flight path angle symbol is positioned on the display as a function of the measured flight path angle if it is determined that the aircraft is not operating within the selected flight envelope.

2. The method as set forth in claim 1 wherein the flight path angle symbol is moved on the display during a transition between a first location wherein the flight path angle symbol is positioned as a function of the selected position of the aircraft flight control and a second location wherein the flight path angle symbol is positioned as a function of the measured flight path angle.

3. The method as set forth in claim 1 wherein:
a. the aircraft is determined to be operating within the selected flight envelope by (i) calculating a difference between the measured flight path angle and the commanded flight path angle, (ii) comparing this calculated difference to a selected range of differences, and (iii) determining that the aircraft is operating within the selected flight envelope when the calculated difference is within the selected range of differences; and
b. the flight path angle symbol is positioned on the display as a function of the commanded flight path angle when the calculated difference is within the selected range of differences.

4. The method as set forth in claim 1 wherein:
a. the aircraft is determined to be operating within the selected flight envelope by (i) calculating a difference between the measured flight path angle and the commanded flight path angle, (ii) measuring a time that the calculated difference exists, (iii) comparing the flight path angle difference to a selected range of differences nd comparing the measured time to a selected range of times, and (iv) determining that the aircraft is operating within the selected flight envelope when the calculated flight path angle difference is within the selected range of differences and the measured time is within the selected range of times; and
b. positioning the flight path angle symbol on the display as a function of the commanded flight path angle when the calculated difference and the measured time are within the selected ranges.

5. The method as set forth in claim 1 wherein:
a. the aircraft is determined to be operating within the selected flight envelope by (i) measuring an airspeed of the aircraft, (ii) comparing the measured airspeed to a selected range of airspeeds, and (iii) determining that the aircraft is operating within the selected flight envelope when the measured airspeed is within the selected range of airspeeds; and
b. the flight path angle is displayed as a function of the commanded flight path angle when the aircraft airspeed is within the selected range.

6. The method as set forth in claim 1 wherein:

a. the aircraft is determined to be operating with the selected flight envelope by (i) measuring an angle of attack of the aircraft, (ii) comparing the measured angle of attack to a selected range of angles of attack, and (iii) determining that the aircraft is operating within the selected flight envelope when the measured angle of attack is within the selected range of angles of attack; and
b. the flight path angle is displayed as a function of the commanded flight path angle when the aircraft angle of attack is within the selected range.

7. The method as set forth in claim 1 wherein:
a. the aircraft is determined to be operating within the selected flight envelope by (i) measuring a pitch attitude of the aircraft (ii) comparing the measured pitch attitude to a selected range of pitch attitudes, and (iii) determining that the aircraft is operating within the selected flight envelope when the measured pitch attitude is within the selected range of pitch attitudes; and
b. the flight path angle is displayed as a function of the commanded flight path angle when the aircraft pitch attitude is within the selected range.

8. The method as set forth in claim 1 additionally comprising the step of automatically operating the aircraft to fly the commanded flight path angle after the aircraft flight control has been moved to the selected position.

9. The method as set forth in claim 2 wherein:
a. a differential exists between the measured flight path angle and the commanded flight path angle; and
b. the differential is adjusted so as to reposition the flight path angle symbol at a selected rate on the display during the transition.

10. The method as set forth in claim 9 wherein the differential is adjusted in amplitude so as to control the movement of the flight path angle symbol on the display during the transition.

11. Apparatus for positioning a flight path angle symbol on a display, the apparatus comprising;
a. means for measuring a flight path angle of the aircraft, and for generating a first output thereof;
b. means for determining a position of a flight control of the aircraft, and for generating a second output thereof;
c. means for determining whether the aircraft is operating within a selected flight envelope, and for generating a third output if it is determined that the aircraft is operating within the selected flight envelope, and a fourth output if it is determined that the aircraft is not operating within the selected flight envelope; and
d. means for displaying one flight path angle symbol on the display including
   (1) first means, responsive to the second and third outputs, for positioning the flight path angle symbol as a function of the aircraft flight control positioning if it is determined that the aircraft is operating within the selected flight envelope, and
   (2) second means, responsive to the first and fourth outputs, for positioning the flight path angle symbol as a function of the measured flight path angle if is is determined that the aircraft is not operating within the selected flight envelope.

12. The apparatus as set forth in claim 11 wherein:

a. the means for determining when the aircraft is operating within the selected flight envelope includes means for
  (1) calculating a commanded flight path angle of the aircraft as a function of the position of the aircraft flight control,
  (2) calculating a difference between the measured flight path angle and the commanded flight path angle and for comparing the calculated difference to a selected range of difference, and
  (3) means for determining the aircraft is not operating within the selected flight envelope when the calculated difference exceeds the selected range of differences; and
b. the first positioning means includes means for positioning the flight path angle symbol so that it is displayed as a function of the measured flight path angle when the calculated difference exceeds the selected range.

13. The apparatus as set forth in claim 12 additionally comprising third means for positioning the flight path angle symbol in a manner that the flight path angle symbol is moved on the display during a transition between positioning the symbol as a function of the measured flight path angle and positioning the symbol as a function of the commanded flight path angle.

14. The apparatus as set forth in claim 13 wherein the third positioning means includes:
a. means for calculating a differential between the measured flight path angle and the commanded flight path angle;
b. means for adjusting the differential so as to reposition the flight path angle symbol at a selected rate on the display; and
c. means for moving the flight path angle symbol during the transition as a function of the adjusted differential.

15. A method of displaying a flight path angle symbol on a display, the method comprising the steps of:
a. measuring a flight path angle of an aircraft;
b. moving a flight control of the aircraft to a selected position to fly a commanded flight path angle;
c. determining whether the aircraft is operating within a first selected flight envelope and a second selected flight envelope; and
d. displaying one flight path angle symbol on the display in a manner that
  (1) the flight path angle symbol is located on the display at a first position as a function of the selected position of the aircraft flight control if it is determined the aircraft is operating within the first selected flight envelope, and
  (2) the flight path angle symbol is located on the display at a second position as a function of the measured flight path angle if it is determined the aircraft is operating within the second selected flight envelope.

16. The method as set forth in claim 15 wherein the displaying step includes moving the flight path angle symbol on the display between the first position and the second position during a transition between locating the flight path angle symbol as a function of the aircraft flight control position and locating the flight path angle symbol as a function of the measured flight path angle.

* * * * *